United States Patent [19]

Huang et al.

[11] Patent Number: 5,396,808
[45] Date of Patent: Mar. 14, 1995

[54] FLUIDIC OSCILLATOR

[75] Inventors: Bao T. Huang, Antony; Phillippe B. J. Hocquet, Vanves, both of France

[73] Assignee: Schlumberger Industries, S.A., Montrouge, France

[21] Appl. No.: 174,102

[22] Filed: Dec. 28, 1993

[30] Foreign Application Priority Data

Apr. 29, 1992 [FR] France .................. 92 05301
Apr. 27, 1993 [WO] WIPO ............... PCT/FR93/00407

[51] Int. Cl.⁶ .......................... G01F 1/20; F15C 1/06
[52] U.S. Cl. ................................ 73/861.19; 137/833
[58] Field of Search ............ 73/861.18, 861.19, 861.21; 137/808, 809, 826, 833

[56] References Cited

U.S. PATENT DOCUMENTS

| | | | |
|---|---|---|---|
| 4,182,172 | 1/1980 | Wennberg et al. | 73/861.19 |
| 4,854,176 | 8/1989 | Okabayashi | 73/861.19 |
| 4,976,155 | 12/1990 | Challendes | 73/861.19 |

FOREIGN PATENT DOCUMENTS 0295623  6/1988  European Pat. Off. .

OTHER PUBLICATIONS

*Journal of Physics E/Scientific Instruments*, "Low Reynolds number fluidic flowmetering", 21 (1988) Oct., No. 10, Bristol, Gr. Britain, pp. 977–989.

*Primary Examiner*—Herbert Goldstein
*Attorney, Agent, or Firm*—Sanford J. Asman

[57] ABSTRACT

A fluidic oscillator and a flowmeter comprising means (10, 14, 16) for forming a two-dimensional fluid jet and an obstacle (22) having a main cavity (26) swept by the oscillating jet, and secondary cavities (34, 36) on either side of the main cavity (26) enabling the radial extension of main vortices accompanying the oscillation of the jet to be made dependent on flow conditions. Applicable to the measurement of the velocity or flow rate of flowing fluid.

19 Claims, 6 Drawing Sheets

FLUIDIC OSCILLATOR

The present invention concerns a fluidic oscillator and a flowmeter for a flowing liquid or gaseous fluid.

BACKGROUND OF THE INVENTION

Most of the flowmeters or simply meters in existence at present include moving mechanical parts. This is especially true of spinner and membrane flowmeters.

In contrast, fluidic oscillators do not have any moving part which could wear out with time, and therefore oscillators do not have to be recalibrated.

Such oscillators can be of small size and of very simple structure. Their reliability is thus very high. Moreover, they provide a frequency signal which can easily be converted into a digital signal. This characteristic is particularly advantageous for remote reading of meters.

Most of the efforts to develop such flowmeters have been applied to vortex flowmeters commonly called vortex effect flowmeters and Coanda effect flowmeters.

The principle of operation of vortex effect flowmeters is based on the well known fact that the presence of an obstacle in a duct in which a fluid is flowing gives rise to periodic release of vortices. The measurement principle consists in detecting the frequency of detachment of the vortices, which is proportional to the rate of flow, for an obstacle of given geometry.

The frequency of the vortices is measured in various ways, allowing the mean rate of release and thus of the flow to be determined. Vortex effect flowmeters are generally very sensitive to noise and to the upstream fluid conditions. In practice a flow rectifier is used to render the speed profile uniform. A flowmeter of this type is described in the patent U.S. Pat. No. 3,589,185 for example.

The Coanda effect used in the flowmeters of the same name consists in the natural tendency of a fluid jet to follow the contours of a wall when the jet is discharged near to this wall, even when the contour of the wall diverges from the discharge axis of the jet. A fluidic oscillator of this type comprises a chamber in which the fluid jet discharges through a convergent nozzle. Two lateral walls are located in the chamber, symmetrically about to the discharge axis of the jet. The jet issuing from the input to the oscillator attaches itself spontaneously to one of the lateral walls through the Coanda effect. A portion of the flow is then diverted by a side channel of the wall to which the jet has attached, which results in the jet detaching from this wall and attaching itself to the opposite wall. The phenomenon repeats itself and leads to a permanent oscillation of the input flow. Unfortunately the range of flow measurement is relatively limited with this type of apparatus and the non-linearity of the calibration curve is rather large. Moreover, this type of apparatus can cease to oscillate under certain conditions involving external perturbations, and a loss of signal results. In order to increase the possible range of measurement, Okabayushi et al. have proposed in U.S. Pat. No. 4,610,162 to combine two fluidic oscillators, one operating at low flow rates and the other at high flow rates.

Because of the problems encountered with vortex effect and Coanda effect flowmeters, attempts have been made to develop other types of fluidic oscillators which operate in accordance with fundamentally different principles. One application is to be found in the flowmeters described in U.S. Pat. Nos. 4,184,636, 4,244,230 and 4,843,889.

For example, U.S. Pat. No. 4,244,230 describes a fluidic oscillator flowmeter located in a duct in the path of the fluid, of which it takes off a part. The oscillator has two members located side by side with face to face walls forming a nozzle. An obstacle has a front cavity facing the nozzle.

The cavity has a common inlet and outlet. The jet leaving the nozzle penetrates into the cavity and strikes the bottom of the cavity.

The transverse oscillation of the jet in the cavity is accompanied by the formation of two vortices, one on each side of the jet. Each vortex is alternately strong and weak, each out of phase with the other. The jet leaves by the common outlet and is directed into the main flow.

Pressure sensors allow the frequency of the oscillations of the jet in the cavity to be measured, which frequency is proportional to flow rate.

The performance of this type of flowmeter is generally better than that obtained with conventional fluid flowmeters. Unfortunately the performance is not entirely satisfactory, in particular in relation to sensitivity and measurement range and also in relation to the linearity of the device in said range.

It is an object of the present invention to overcome these problems. The invention provides a fluidic oscillator and a flowmeter comprising such an oscillator of performance that is improved over that of the prior art flowmeters.

Conventionally, the linearity of such a fluidic oscillator is estimated by the relative variations in the factor K equal to the ratio of the frequency f of the oscillation of the jet divided by the flow rate Q.

In general three flow conditions are distinguished in order of increasing flow rates: laminar conditions, transition conditions, and turbulent conditions.

OBJECT AND SUMMARY OF THE INVENTION

Figure 1:
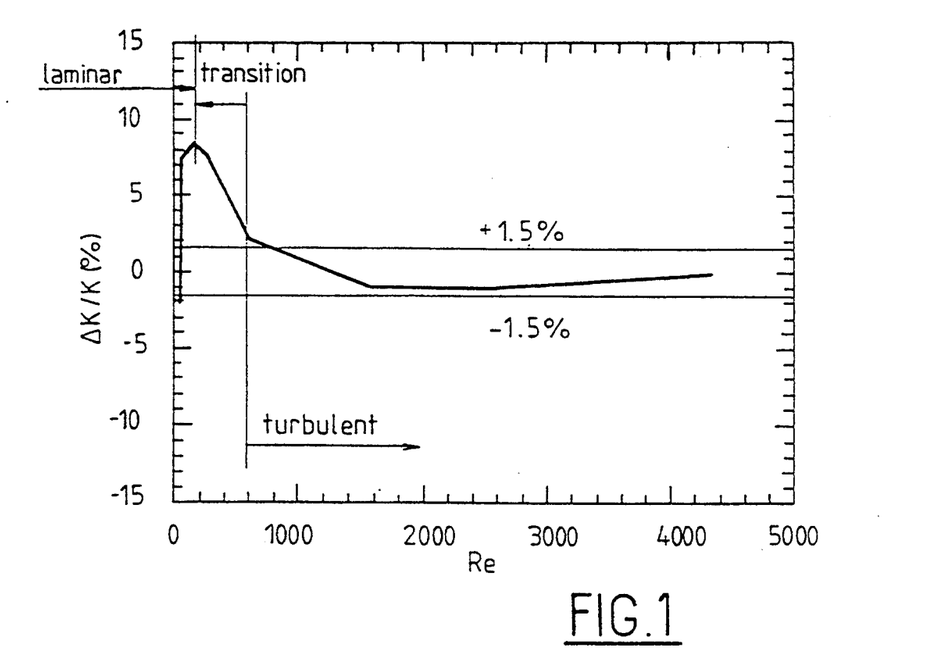
FIG. 1, already described, schematically represents the relative variation in the factor K as a function of flow rate for a fluidic oscillator of the prior art.

It will be seen in FIG. 1 representing the relative variation in K, viz. $\Delta K/K$ as a function of the Reynolds number RE that problems with linearity occur essentially in the laminar and transition conditions. (It will be recalled that the Reynolds number, well known to the person skilled in the art, is equal to the speed of the fluid in the region of the inlet orifice to the oscillator chamber multiplied by the width of this orifice and divided by the kinetic viscosity of the fluid). It can be seen that, in laminar conditions and with a low flow, the relative variation in the factor K falls off abruptly. In the transition zone, on the edge of the laminar conditions zone, the curve has a peak. The invention concerns a fluidic oscillator which is linear throughout a wide range. It is considered that such an oscillator is linear when the relative variation in the factor K is less than $\pm 1.5\%$. As will be shown below, the invention makes it possible to reduce the peak in the relative variation in the factor K in transition conditions and thus to increase the range of linear operation correspondingly.

The fluidic oscillator in accordance with the invention is symmetrical about a longitudinal plane of symmetry. It comprises:

means for creating a two-dimensional jet oscillating transversely relative to the longitudinal plane of symmetry with vortices on either side of the jet, these vortices being alternately strong and weak in phase opposition and in connection with the oscillation of the jet; and furthermore means adapted to render the radial extension of the vortices dependent on the flow conditions of the jet. By "radial extension" is meant the distance from the center of the vortex to its periphery.

In a specific implementation of the invention, the oscillator comprises:

a fluid inlet comprising an inlet orifice of width d and adapted to form an oscillating two-dimensional fluid jet and vortices on either side of the jet;

an oscillation chamber connected to the fluid inlet orifice; and an obstacle located in the oscillation chamber and having a front part in which there is formed a main cavity facing the fluid inlet orifice, the means adapted to render the radial extension of the vortices dependent on the flow conditions comprising at least two secondary cavities formed in the front part of the obstacle, these secondary cavities being disposed symmetrically about the plane of symmetry on either side of the main cavity.

In this implementation, with a high flow rate, a secondary vortex forms in each secondary cavity. The main vortices are localized between the front part of the obstacle and the wall of the oscillation chamber. Their radial extension is limited by the radial extension of the secondary vortices. As a result there is an increase in the factor K. On the contrary, under transition conditions and with a falling flow rate, the radial extension of the main vortices increases in size more and more, to the detriment of that of the secondary vortices localized within the secondary cavities. The limit case of these operating conditions is reached when the main vortices, during the period in which they are large, fill the secondary cavities completely. However, while they are large, the greater the radial extension of the main vortices participating in the phenomenon of jet oscillation, the more the frequency of oscillation of the jet falls. As a result, the factor K and its relative variation are reduced and thus there is in general an increase in the linear operating conditions of the oscillator.

The main cavity advantageously has inclined walls making substantially a V whose two arms flare apart towards the outside of the cavity.

The walls of the main cavity can have an entrance angle relative to the plane of symmetry within a range from 0° to 80°.

The cavity advantageously has a substantially parabolic bottom. When the entrance angle is 0°, the main cavity is rectangular but the walls of the main cavity preferably have an entrance angle relative to the plane of symmetry within a range from 10° to 45°. The distance separating the bottom of the main cavity from the inlet orifice may lie within a range from 3 d to 15 d.

The measured frequency during the oscillation of the jet depends on this distance from the bottom of the cavity to the inlet orifice. In order to measure a sufficiently high frequency, this distance advantageously lies in a range from 4 d to 8 d.

The main cavity advantageously has an inlet of width lying in the range from 2 d to 10 d.

In a particular embodiment the front part of the obstacle has a width lying in a range from 5 d to 30 d.

The front part of the obstacle is substantially perpendicular to the plane of symmetry. It can be located at a distance from the inlet orifice lying in a range from 1 d to 10 d.

In a specific embodiment of a fluidic oscillator with an obstacle provided with secondary cavities, the latter have substantially a shape contained within a quadrilateral with an open face forming the inlet to the secondary cavity, this shape being tangential to three sides of the quadrilateral.

In another embodiment, each secondary cavity has substantially a shape contained within a triangle with an open side forming the inlet to the secondary cavity, this shape being tangential to two sides of the triangle.

In a specific implementation, each secondary cavity has a stepped bottom.

In a specific implementation, each secondary cavity has an inlet of width lying in a range from 1 d to 10 d.

The fluid inlet advantageously comprises a hexahedral settling chamber adapted to be connected to an inlet duct, and a convergent section connected to one side of the settling chamber, this convergent section having a rectangular inlet orifice of width d adapted to be connected to the oscillation chamber.

The fluid inlet preferably also comprises means for conditioning the fluid jet.

In one variant, these conditioning means are formed by a plate located along the plane of symmetry.

In another variant, these conditioning means are formed by a profiled obstacle located along the plane of symmetry.

The conditioning means advantageously have an end spaced from the inlet orifice at a distance lying within a range from 0.5 d to 4 d.

The present invention also concerns a flowmeter comprising such a fluidic oscillator.

BRIEF DESCRIPTION OF THE DRAWINGS

The features of the invention appear better from reading the description which follows with reference to the accompanying drawings, in which.

MORE DETAILED DESCRIPTION

Figure 2:
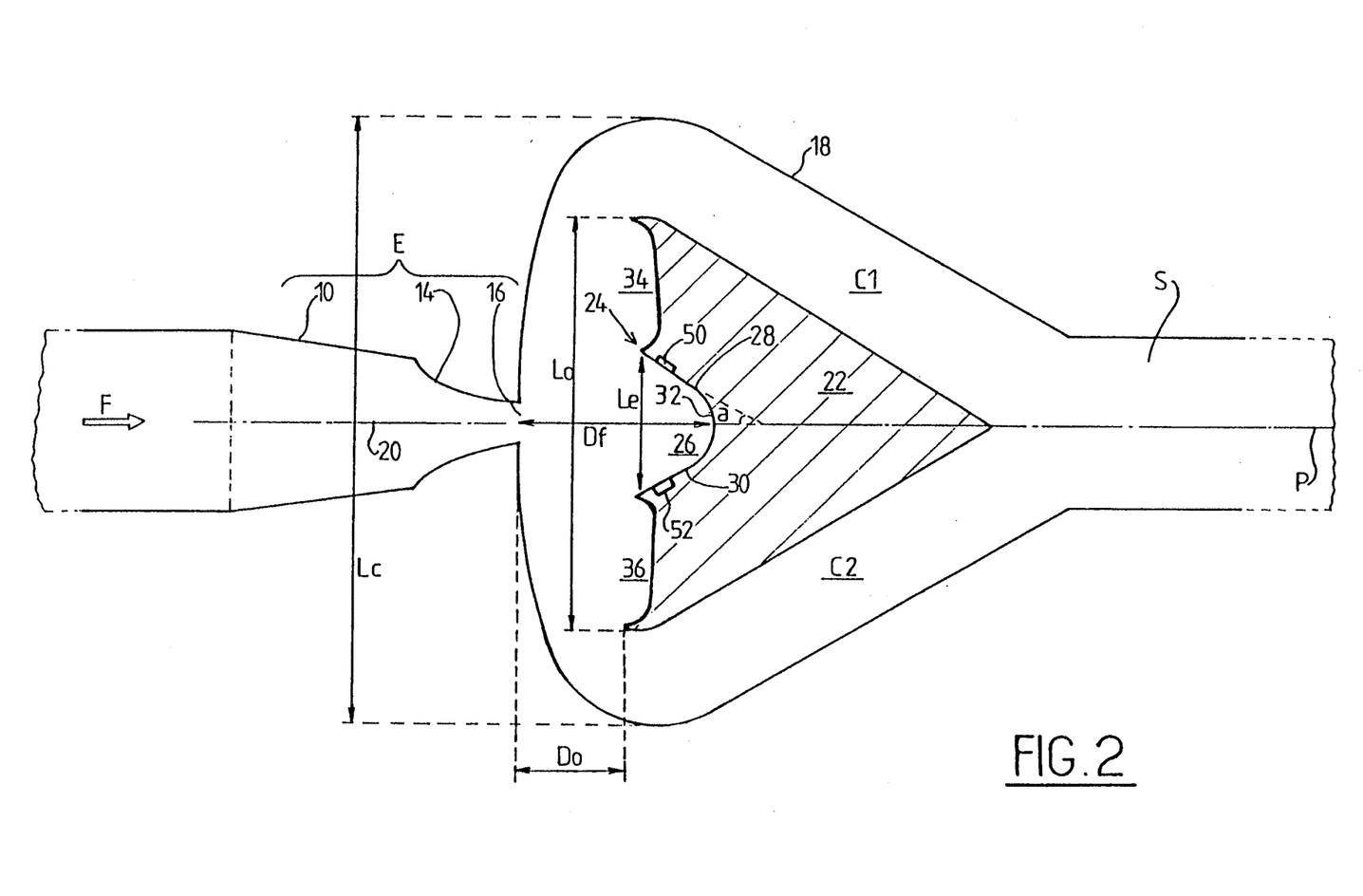
FIG. 2 shows a fluidic oscillator in conformity with the invention schematically, seen from above.

FIG. 2 is a view from above of a fluidic oscillator in conformity with the invention. The fluid may be a liquid or a gas. The oscillator has a longitudinal plane of symmetry P.

Figure 3:
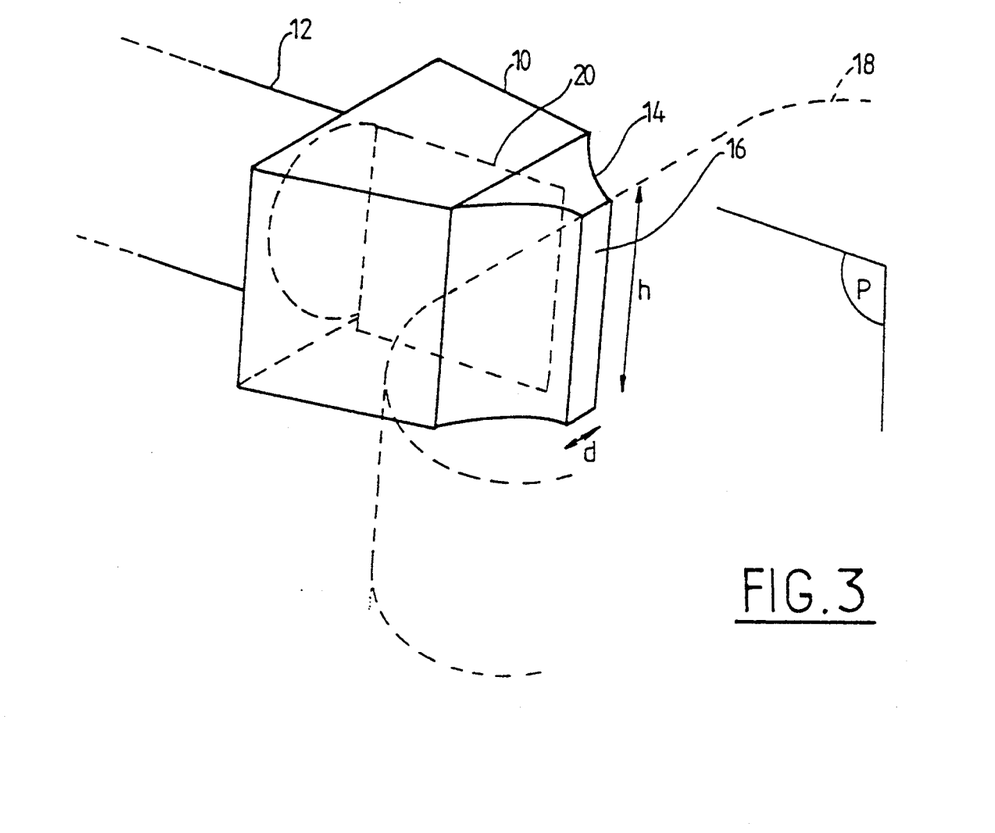
FIG. 3 is a schematic perspective view of a fluidic oscillator in conformity with the invention.

The fluid penetrates into the oscillator through an inlet E comprising, as can be seen in FIG. 3, a settling chamber 10 connected to the fluid inlet duct 12 and a convergent section 14 terminating in a rectangular inlet orifice 16.

The settling chamber 10 has a hexahedral shape, the area of its front face (connected to the inlet duct) being greater than the area of its rear face (connected to the convergent section). Its rear face is preferably cubic with a side equal to the height of the two-dimensional jet. It allows the cylindrical jet of fluid leaving the inlet duct 12 to be transformed into a jet with a substantially rectangular cross-section. The convergent section 14, as well as accelerating the fluid, allows the formation of the oscillating two-dimensional jet. For this the inlet orifice 16 into the oscillation chamber 8 has a rectangular shape with a length h and a width d, whose ratio complies with the conditions for two-dimensional behavior well known to the person skilled in the art.

In general terms, the ratio h\d should be in the order of or greater than 6. The width d is taken as the unit of reference in the following description.

Figure 4:
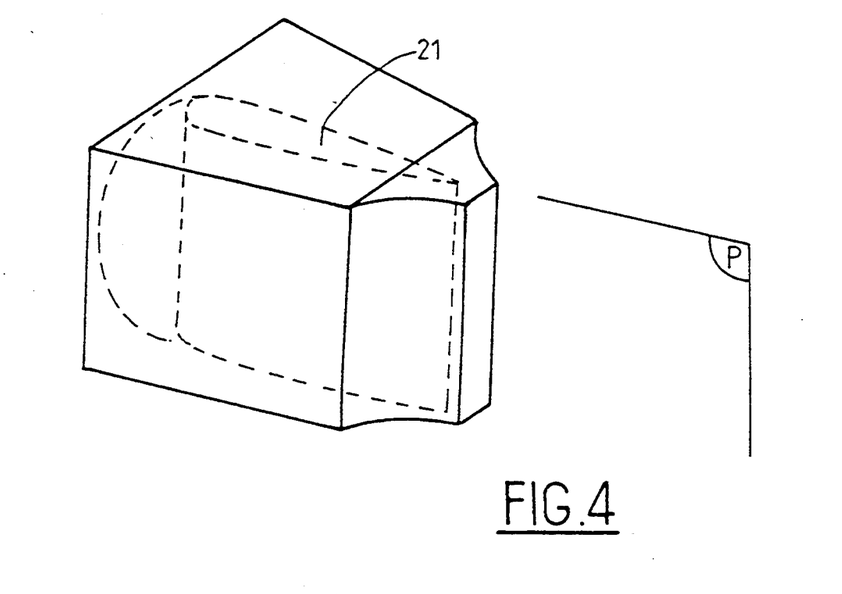
FIG. 4 is a schematic perspective view of a modified form of the inlet of a fluidic oscillator in conformity with the invention.

The inlet E further comprises means for conditioning the fluid. These means can be formed by a plate 20 disposed along the plane of symmetry P. FIG. 4 shows schematically a variant embodiment of these conditioning means. In this variant, the means are formed by a profiled obstacle 21 located along the plane of symmetry P.

Figure 5:
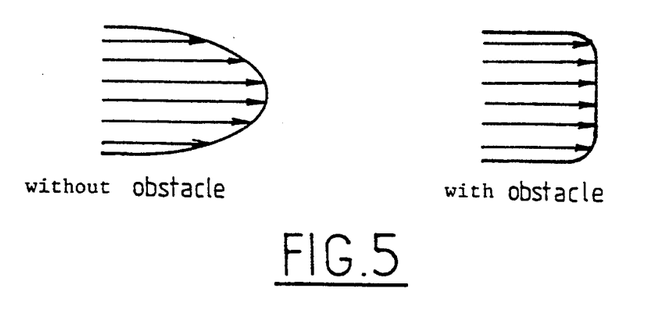
FIG. 5 shows a velocity profile of the fluid jet schematically, with and without an obstacle.

As can be seen in FIG. 5, the conditioning consists in rendering the velocity profile of the jet, which is naturally parabolic at low flow rates, substantially flat, knowing that it remains flat at high flow rates. Accordingly the speed profile remains the same for all flow rates.

The end of the plate 20 or of the obstacle 21 facing the inlet orifice 16 is spaced from the said inlet orifice by a distance lying in the range from 0.5 d to 4 d in order to obtain the desired effect under the most favorable conditions.

For example, this distance could be equal to 1 d.

Returning to FIG. 2, it is seen that the oscillating two-dimensional jet penetrates into an oscillation chamber 18 comprising an obstacle 22. The chamber and obstacle are symmetrical relative to the longitudinal plane of symmetry P. The obstacle 22 has a front part 24 substantially perpendicular to the longitudinal plane of symmetry P and located a distance Do from the inlet orifice 16 lying within a range from 1 d to 10 d. For example, this distance may be equal to 3 d.

The front part 24 of the obstacle 22 has a width Lo lying in a range from 5 d to 30 d. For example this width may be equal to 12 d.

The oscillation chamber 18 has its greatest width Lc in the region in which the front part of the obstacle is located; Lc may lie within the range from 10 d to 50 d. For example, Lc may be equal to 20 d. The spaces located between the obstacle and the walls of the chamber form channels C1, C2 for flow of the fluid, which direct this towards an outlet orifice. The width of these channels is substantially equal to Lc−Lo. A main cavity 26 is formed in the obstacle 22 facing the inlet orifice 16.

This main cavity 26 has an inlet of width Le lying within a range from 2 d to 20 d. For example, Le may be equal to 5 d. In the embodiment shown in FIG. 2, the main cavity has inclined walls 28, 30 forming substantially a V whose arms open out towards the exterior of the cavity 26.

The walls 28, 30 have an entrance angle a1 relative to the plane of symmetry P lying in a range from 0° to 80°. Advantageously a1 lies in a range from 10° to 45°. It may be equal to 45° for example.

In the embodiment shown in FIG. 2, the lateral walls 28, 30 of the main cavity 26 converge to a substantially parabolic bottom 32. The bottom of the main cavity faces the inlet orifice 16 at a distance Df therefrom, Df lying in a range from 3 d to 15 d. Df may be equal to 6 d for example.

The oscillation of the two-dimensional jet in the oscillation chamber 18 is accompanied by the formation of vortices located on either side of the jet, alternately strong and weak in phase opposition and in sympathy with the oscillation. The vortices are located mainly in the space between the front part 24 of the obstacle 22 and the wall of the chamber 18 in which the inlet orifice 16 is formed. Having penetrated into the oscillation chamber 18, the jet strikes the walls and the bottom of the main cavity 26 with an alternating sweeping movement.

In conformity with the invention, the fluidic oscillator comprises means adapted to render the radial extension of the vortices dependent on the flow conditions of the jet.

The vortices do not have a circular cross-section; rather they deform during the course of oscillation of the jet. As a result the radial extension is considered to mean the distance between the center of the vortex in question and its perimeter.

Figure 6:
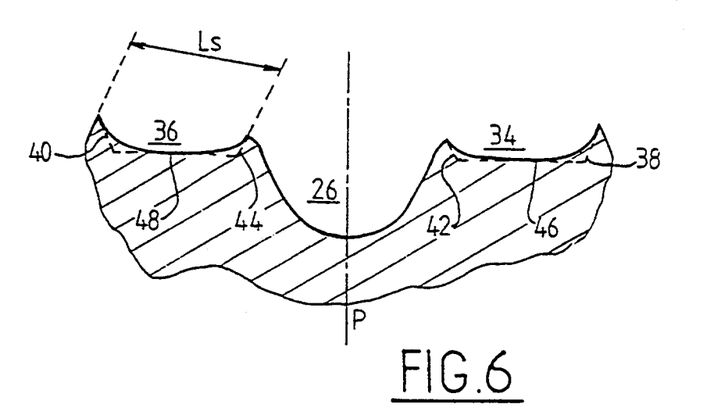
FIG. 6 is a schematic partial view from above of an obstacle placed in a fluidic oscillator in conformity with the invention.

In the embodiment of FIG. 2, the means adapted to render the radial extension of the vortices dependent on the flow conditions of the jet are formed by two secondary cavities 34, 36 formed in the front part 24 of the obstacle 22, symmetrically relative to the plane of symmetry P, on either side of the main cavity 26. In FIG. 6, the secondary cavities 34 and 36 have a shape contained within a quadrilateral having one side open to form an inlet. The shape of the cavity is thus tangential to three sides of the quadrilateral. Each secondary cavity in its shape delimited by a quadrilateral has a first, outer sidewall 38, 40, a second, inner sidewall 42, 44 and a bottom 46, 48.

Figure 7:
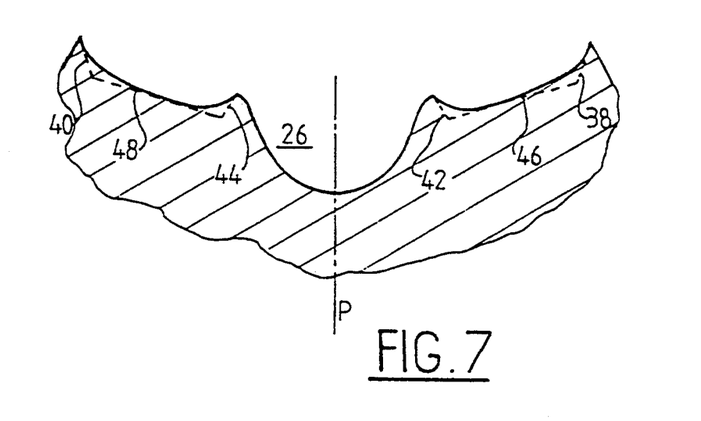
FIG. 7 is a schematic partial view from above of a modified form of such an obstacle.

The inclination of the sidewalls relative to a plane parallel to the plane of symmetry P can assume large values of angle without the operation of the device being greatly modified. In FIG. 6, the bottoms of the secondary cavities are perpendicular to the plane of symmetry P but, as seen in FIG. 7, they may form an entrance angle with this plane and this angle may assume values up to +45°.

The inlet to each secondary cavity has a width Ls lying in a range from 1 d to 15 d.

The shape of the secondary cavities may go from the quadrilateral itself (with an open side forming the inlet) to a curved shape only making contact at one point with each of the sides of the quadrilateral.

Figure 8:
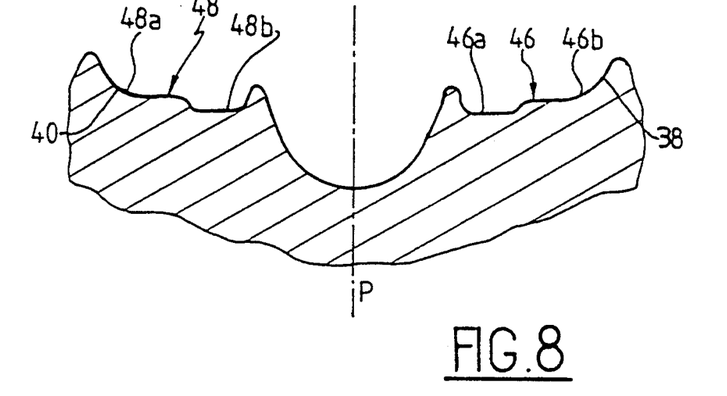
FIG. 8 is a schematic partial view from above of another modified form of such an obstacle.

In a variant implementation shown schematically in FIG. 8, it is seen that the bottom 46, 48 of the cavity can be stepped; in this example, the bottoms 46 and 48 have two steps, respectively 46a, 46b and 48a, 48b but they could have more. These steps may be perpendicular to the plane of symmetry P or may well make an angle therewith other than 90°.

Figure 9:
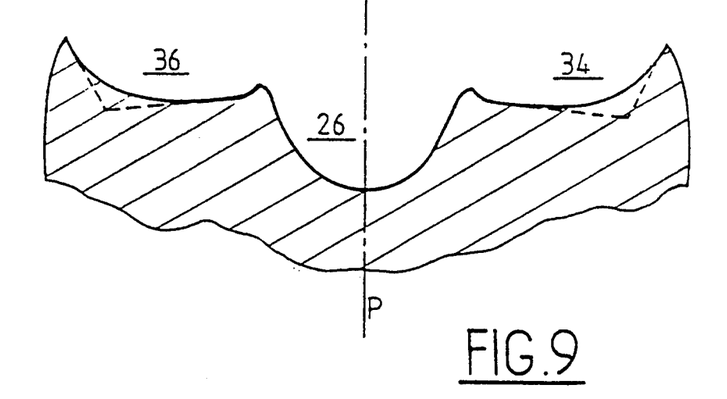
FIG. 9 is a schematic partial view from above of another modified form of such an obstacle.

The riser separating the steps may be parallel to the plane of symmetry P or may equally well form an entrance angle other than 0°. In particular the riser may be parallel to the outer sidewall 38, 40. In FIG. 9 the secondary cavities 34 and 36 have a shape contained within a triangle of which one side is open to form an inlet. The shape of the secondary cavities is thus tangential to two sides of the triangle. Again the shape of the secondary cavities may go from the triangle itself (with one open side forming the inlet) to a curved shape only making contact at one point with each of the sides of the triangle.

Figure 10:
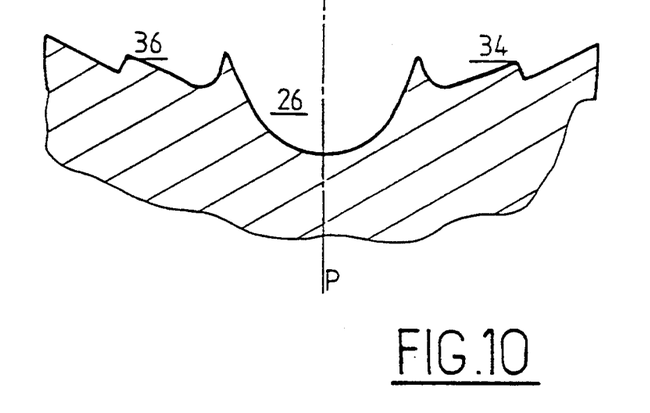
FIG. 10 is a schematic partial view from above of another modified form of such an obstacle.

In FIG. 10, the bottom of the secondary cavities is stepped. It will be further understood that the shapes described above can adopt equivalent geometries, with various limit shapes fulfilling the same function.

In turbulent conditions, whatever the point of impact of the fluid jet in the main cavity 26, a secondary vortex forms in each secondary cavity 34, 36. These secondary vortices are sufficiently strong for the fluidic oscillator to function as a whole in the same manner as an oscillator with no secondary cavity. The following description concerns the general behavior of the device under transition conditions; it is given with reference to FIGS. 11 and 12.

Figure 11:
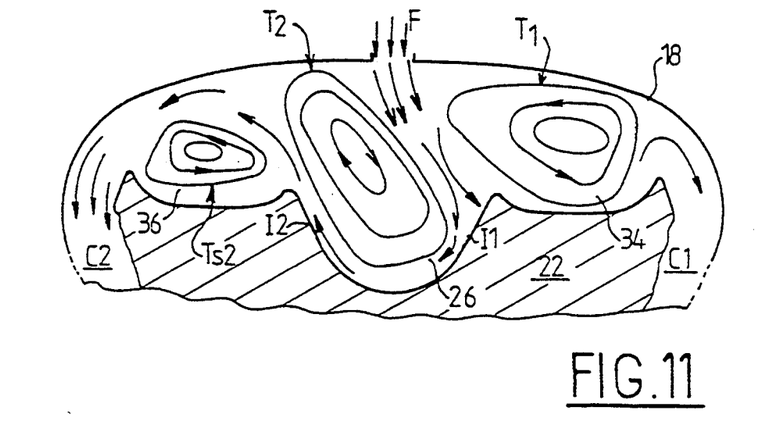
FIG. 11 is a schematic partial view from above of a fluidic oscillator in conformity with the invention operating in the transition conditions.
Figure 12:
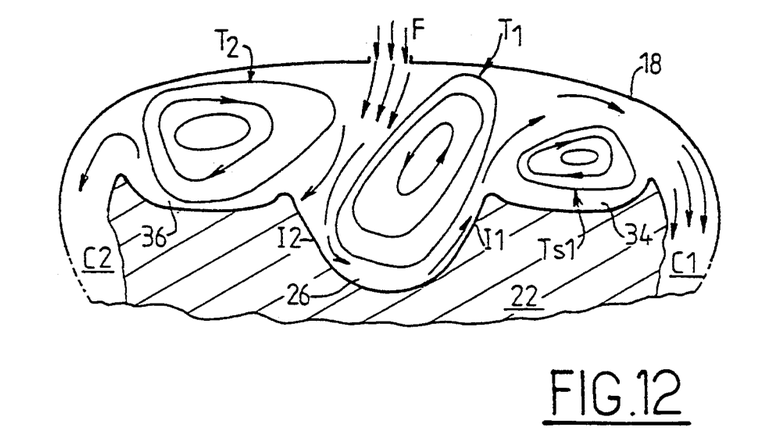
FIG. 12 shows the fluidic oscillator of FIG. 11 schematically, but at a different instant.

The point of impact of the fluid jet F sweeps the main cavity 26 between the extreme points I1 and I2. The oscillation is accompanied by the formation of main vortices T1 and T2 localized between the front part of the obstacle 22 and the wall of the oscillation chamber 18 adjoining the inlet orifice.

In FIG. 11, the impact of the jet reaches the point I1 and the vortex T1 is then concentrated and strong while the vortex T2 is weak. The fluid jet escapes mainly via the channel C2.

Under turbulent conditions, the two secondary cavities 34, 36 are filled by secondary vortices Ts1 and Ts2, alternately strong and weak in phase opposition with the main vortices. However, the more the flow rate decreases, the more the intensity or concentration of these secondary vortices decreases.

As a result, the strong main vortex, as it occurs at T1 in FIG. 11, sees its radial extension increase, so that, when the flow rate decreases, the vortex progressively occupies the secondary cavity 34 to the detriment of the secondary vortex Ts1, which disappears totally in the end. In contrast, the secondary vortex Ts2 created by the escape of the fluid jet is always present in the secondary cavity 36.

In FIG. 12 the point of impact of the fluid jet is located at I2; it is then the vortex T2 which has an increased radial extension, the vortex Ts2 disappearing completely when the flow is sufficiently low. The main vortices, when concentrated and strong, have a radial extension that is greater under transitional conditions than that which they have under turbulent conditions (since under turbulent conditions the secondary cavities are both occupied by secondary vortices, and the space available for the development of the main vortices is reduced). The frequency of oscillation decreases with increasing radial extension of the main vortices.

Figure 13:
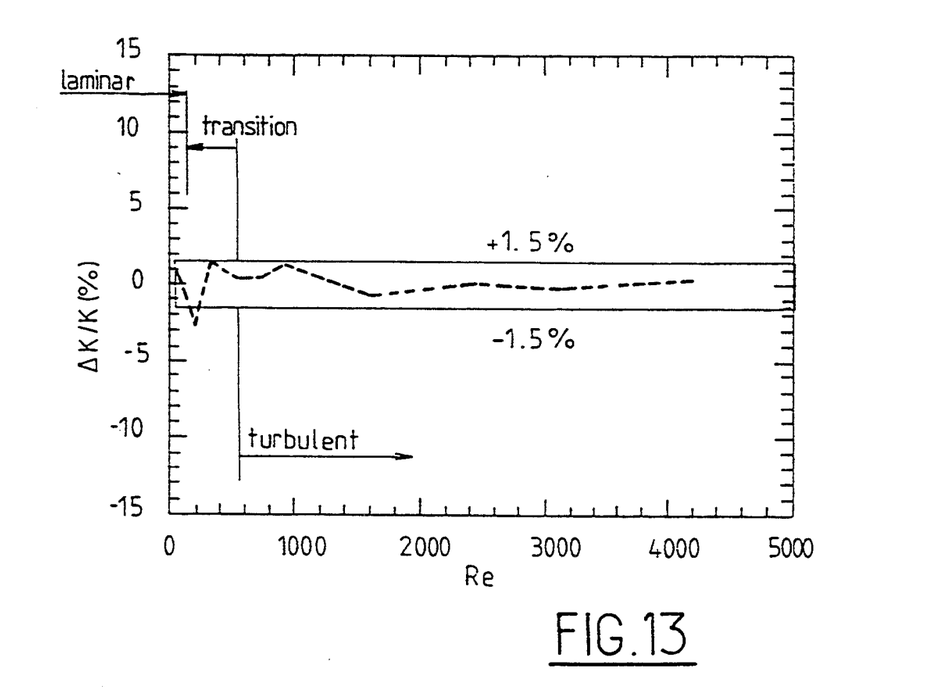
FIG. 13 shows schematically the relative variation of the factor K as a function of flow rate for an oscillator in conformity with the invention.

It can be seen from FIG. 13, which shows schematically the relative variation in the factor K as a function of the Reynolds number for a device in conformity with the invention, that the fact that the radial extension of the vortices is made dependent on flow conditions makes it possible to increase the oscillation frequency under turbulent conditions and to reduce the oscillation frequency in the transition conditions, thus to improve the linearity of the oscillator.

The fluidic oscillator of FIG. 2 enables the fluid flow passing therethrough to be measured by means of two pressure tappings 50 and 52 located at the end points of the sweep of the fluid jet inside the main cavity 26. These pressure tappings are connected to known devices which enable the oscillation frequency of the jet to be measured. This frequency is related to flow rate by a preliminary calibration. A flowmeter is thus obtained which is linear over an extended range of measurement.

We claim:

1. A fluidic oscillator symmetrical about a longitudinal plane of symmetry (P), comprising:
   a) means for creating a two-dimensional jet oscillating transversely relative to the plane of symmetry resulting in two vortices ($T_1$, $T_2$), one on each side of the jet, wherein one of these vortices is strong when the other is weak, and wherein the respective strength of each vortex alternates in sympathy with the oscillation of the jet;
   b) means for rendering the radial extension of the vortices dependent on the flow conditions of the jet; and
   c) an oscillation chamber substantially free of obstructions adjacent to its inner periphery but including disposed centrally therein said means for rendering, and wherein said means for rendering includes an obstacle located in said oscillation chamber.

2. A fluidic oscillator according to claim 1, further comprising:
   a) a fluid inlet (E) connected to the oscillation chamber (18), the fluid inlet comprising an inlet orifice with a width, d, said fluid inlet being adapted to form an oscillating two-dimensional fluid jet; and
   b) the obstacle located in the oscillation chamber, said obstacle having a front part in which there is formed a main cavity facing the inlet orifice, and wherein the means for rendering comprises at least two secondary cavities formed in the front part of the obstacle, the secondary cavities disposed symmetrically relative to the plane of symmetry (P).

3. A fluidic oscillator according to claim 2, characterized in that the main cavity (26) has inclined walls (28, 30) making substantially a V whose two arms flare apart towards the outside of the cavity.

4. A fluidic oscillator according to claim 3, characterized in that the walls (28, 30) of the main cavity (26) have an entrance angle (a1) relative to the plane of symmetry (P) lying within a range from 0° to 80°.

5. A fluidic oscillator according to claim 4, characterized in that the walls (28, 30) of the main cavity (26) have an entrance angle (a1) relative to the plane of symmetry (P) lying within a range from 10° to 45°.

6. A fluidic oscillator according to claim 2, characterized in that the bottom (32) of the main cavity (26) is located opposite the inlet orifice (16) at a distance (Df) from the inlet orifice lying within a range from 3 d to 15 d.

7. A fluidic oscillator according to claim 6, characterized in that the bottom (32) of the main cavity (26) is located opposite the inlet orifice (16) at a distance (Df) from the inlet orifice lying within a range from 4 d to 8 d.

8. A fluidic oscillator according to claim 2, characterized in that the main cavity (26) has an inlet of width (Le) lying within a range from 2 d to 10 d.

9. A fluidic oscillator according to claim 2, characterized in that the front part (24) of the obstacle (22) has a width (Lo) lying within a range from 5 d to 30 d.

10. A fluidic oscillator according to claim 2, characterized in that the front part (24) of the obstacle (22) is substantially perpendicular to the plane of symmetry (P) and is located at a distance (Do) from the inlet orifice (16) lying within a range from 1 d to 10 d.

11. A fluidic oscillator according to claim 2, characterized in that each secondary cavity (34, 36) has substantially a shape contained within a quadrilateral with an open face forming the inlet to the secondary cavity, this shape being tangential to three sides of the quadrilateral.

12. A fluidic oscillator according to claim 2, characterized in that each secondary cavity (34, 36) has substantially a shape contained within a triangle with an open side forming the inlet to the secondary cavity, this shape being tangential to two sides of the triangle.

13. A fluidic oscillator according to claim 12, characterized in that each secondary cavity (34, 36) has a stepped bottom.

14. A fluidic oscillator according to claim 12, characterized in that each secondary cavity (34, 36) has an inlet of width (Ls) lying within a range from 1 d to 10 d.

15. A fluidic oscillator according to claim 2, characterized in that the fluid inlet (E) comprises a hexahedral settling chamber (10) adapted to be connected to an inlet duct (12), and a convergent section (14) connected to one side of the settling chamber (10), this convergent section having a rectangular inlet orifice (16) of width d adapted to be connected to the oscillation chamber (18).

16. A fluidic oscillator according to claim 15, characterized in that the fluid inlet (E) further comprises means (20, 21) for conditioning the fluid jet.

17. A fluidic oscillator according to claim 16, characterized in that the conditioning means are formed by a plate (20) located along the plane of symmetry (P).

18. A fluidic oscillator according to claim 16, characterized in that the conditioning means are formed by a profiled obstacle (21) located along the plane of symmetry (P).

19. A fluidic oscillator according to claim 18, characterized in that the conditioning means have an end spaced from the inlet orifice by a distance lying within a range from 0.5 d to 4 d.

* * * * *